United States Patent [19]

Braun

[11] Patent Number: 5,539,988
[45] Date of Patent: Jul. 30, 1996

[54] BICYCLE RIM CENTERING DEVICE

[76] Inventor: Gert Braun, Wuerttemberger Strasse 14, D-78567 Fridingen, Germany

[21] Appl. No.: 563,357

[22] Filed: Nov. 28, 1995

Related U.S. Application Data

[63] Continuation of Ser. No. 263,545, Jun. 22, 1994, abandoned.

[30] Foreign Application Priority Data

Jun. 22, 1993 [DE] Germany ............... 43 20 585.2

[51] Int. Cl.$^6$ ............... G01B 5/00; G01B 121/14
[52] U.S. Cl. ............... 33/203.19; 33/833; 33/572
[58] Field of Search ............... 33/203, 203.18, 33/203.19, 832, 833, 545, 546, 501.05, 572

[56] References Cited

U.S. PATENT DOCUMENTS

| | | |
|---|---|---|
| 621,153 | 3/1899 | Schmidt ............... 33/203.19 |
| 640,607 | 2/1900 | Wardwell ............... 33/203.19 |
| 1,073,042 | 9/1913 | Heller ............... 33/203.19 |
| 3,956,829 | 3/1976 | Moxon . |
| 5,193,283 | 3/1993 | Hsiao . |
| 5,201,782 | 4/1993 | Barlett . |
| 5,243,765 | 9/1993 | Lynch . |

FOREIGN PATENT DOCUMENTS

| | | |
|---|---|---|
| 072066 | 3/1960 | France ............... 33/832 |
| 605953 | 11/1934 | Germany ............... 33/203.19 |
| 668900 | 11/1938 | Germany . |
| 1548307 | 10/1969 | Germany . |
| 2813775 | 12/1978 | Germany . |
| 3434167 | 3/1986 | Germany . |
| 7805900 | 12/1979 | Netherlands ............... 33/832 |
| 252476 | 12/1947 | Switzerland . |

OTHER PUBLICATIONS

Bicycle Catalog of Company Brügelmann Bicycles GmbH in Sulzbach Mar. 1994, p. 495.

How Does One Check Wheels and Tires of Commercial Vehicles for Out-of-Round and Out-of-True; Krafthand 1965, vol. 23, p. 1550 (no month).

*Primary Examiner*—Thomas B. Will
*Attorney, Agent, or Firm*—Dominik & Stein

[57] ABSTRACT

A bicycle centering device consisting of a mounting assembly (5) which can be mounted on the frame or on the fork (1) of a bicycle, a pivot arm (33), which on one end is rotatably and pivotably connected to the mounting assembly (5) and which on the other end is rotatably and pivotably connected to a dial gauge (52), so that a sensor probe (53), the dial gauge (52) and the rim (2) can be brought into contact.

3 Claims, 3 Drawing Sheets

BICYCLE RIM CENTERING DEVICE

This is a continuation of application Ser. No. 08/263,545 filed on Jun. 22, 1994 now abandoned.

BACKGROUND OF THE INVENTION

1. Field of the Invention

The invention concerns a bicycle rim centering device, and more particularly a device which is compact, comparatively inexpensive, and easy to use.

2. Description of the Related Art

Devices, which are used for centering of bicycle rims, have long been known. For centering, the wheel must be dismounted and secured in a special device. At various terminals the degree of disadjustment can be measured. For centering of the rim the spokes are adjusted by hand. Such centering devices are found mainly in bicycle repair shops. The disadvantages of such known devices is that they require a relatively large amount of space, that they must be stable, that they are relatively expensive to produce, and that the degree of trueness of rotation is not immediately discernable.

A further possibility for centering bicycle rims comprises the use of a marking chalk to mark the deviating sections of the rim by marking the rim with chalk during rotation, and thereafter adjusting the spokes appropriately. The disadvantage of this method is that it is rather imprecise and that it does not offer any guarantee that the correct trueness will be achieved by the tensioning of a spoke.

The present invention has as it's object, the production of a bicycle rim centering device, with which a simple and rapid centering may be achieved, which requires only a small amount of space, which allows a checking of the proper amount of correction while tightening of a spoke, which therefore is also useful for the average person, and of which the production costs are not high.

SUMMARY OF THE INVENTION

The essential characteristic of the invention consists thereof, to provide on a multi-armed holder a dial gauge and a clamping assembly, which serves to secure the centering device to the bicycle.

The problem is solved by means of a bicycle centering device consisting of a mounting assembly which can be mounted on the frame or on the fork of a bicycle, a dial gauge, and a pivot arm which on one end is rotatably and pivotably connected to the mounting assembly and which on the other end is rotatably and pivotably connected to the dial gauge, so that a sensor probe, the dial gauge and the rim can be brought into contact. Advantageous further developments of the invention are set forth in the dependent claims.

BRIEF DESCRIPTION OF THE DRAWING

Hereafter the invention will be described with reference to one embodiment of the invention as shown in the figures.

There is shown.

DETAILED DESCRIPTION OF THE INVENTION

Figure 1:
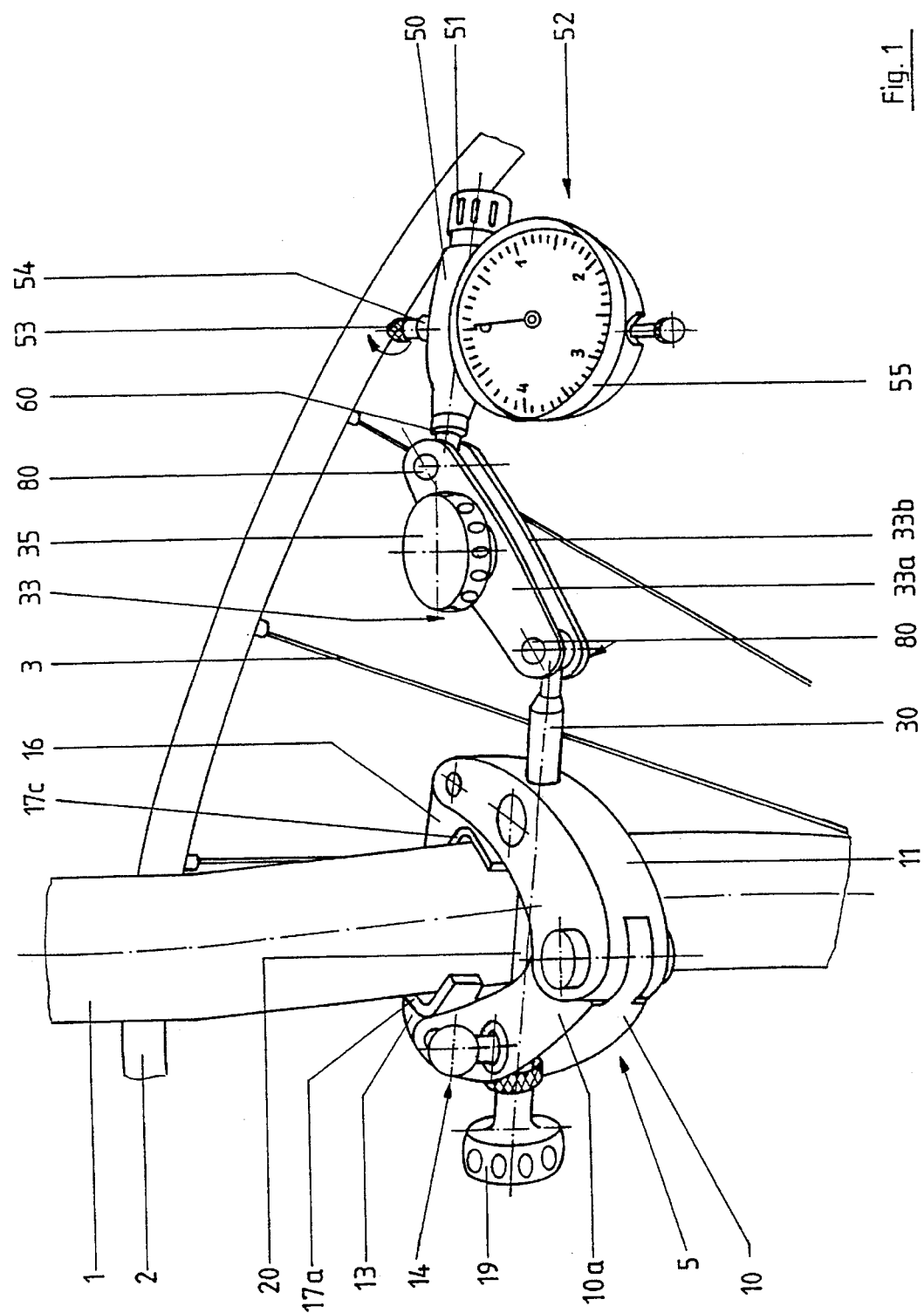
FIG. 1: view of one of the rim aligning devices secured to the forks of a bicycle for the correction of the sideways deviation.

The bicycle rim centering device is essentially comprised of three parts: a mounting assembly 5, a swivel arm 33 and a dial gauge 52. The bicycle rim centering device is mounted on the rim or on the fork 1 of the bicycle by means of the mounting assembly 5.

The mounting assembly 5 is comprised of two connected articulating clamp arms 10, 11. The two clamp arms are provided on their free ends respectively with opposing clamp jaws 13 and 16. The clamp jaw 16 is herein pivotally disposed in the outer clamp arm 11. The two clamp jaws 13 and 16 are fixedly connected on the upper side or, as the case may be, the lower side of the clamp arm 10. The clamp jaws 13 and 16 engage the bicycle fork 1 with their "V" like shape. The inner sides of the clamp jaws 13 and 16 are respectively provided with rubber molding 17a, 17c for protection of the bicycle fork 1 or as the case may be, the frame. In a further illustrative embodiment the clamp jaws 13 and 16 are constructed entirely of plastic.

The two fork-like associated clamp arms 10, 11 are connected by means of a draw rod 20 which on one end is pivotally connected with the outer clamp arm 11 and on the other end of which is provided with threading, which connects to a tightening screw 19 through a threaded bore hole. The tightening screw 19 is associated with a carrier element which is held in a bore hole of a ball pin 14. With the help of the tightening screw 19 the two clamp arms can be drawn towards each other and thereby cause the clamp jaws 13 and 16 to press against the bicycle fork. The mounting assembly is particularly suited for forks or, as the case may be, frames, with a diameter of 6 to 40 mm.

On the free end of the outer clamp arm 11, on the side opposite to the side provided with the clamp jaw 16, there is provided an outwardly extending ball pin 30. The ball pin 30 provides an articulated connection between the mounting assembly 5 and the pivot arm 33. On the upper side 10a of the inner clamp arm 10 a ball pin 14 is provided, which provides an alternative mounting possibility for the pivot arm 33.

The pivot arm 33 is comprised of two superposed parts 33a, b which by means of a clamp screw 35 are held together and which are provided with four bore holes 80 which are receptacles for the ball shaped ends of the ball pin 30 and a further ball pin 60. The pivot arm 33 is connected by means of a ball joint 60 with a rod like gauge holder 50. The dial gauge 52 comprises a tubular projection 54, in which a teflon sensor probe 53 is guided. The tubular projection 54 sits rotatably and axially slidably in a through hole of the gauge holder 50, and runs perpendicularly to the longitudinal axis. It is secured in position by means of clamp screw 51. The ball pin (30 or as the case may be 60) allows for 360° rotation about the longitudinal axis and a pivoting of about 200° along the transverse axis of the corresponding ball joint (30 or as the case may be 60).

In the following the manner of operation of the bicycle centering device is explained in greater detail. The centering device is secured in the vicinity of the rim to be centered on the frame, for example on the bicycle fork 1 by means of the mounting assembly 5. By tightening the tightening screw 19 the inner and the outer clamp arms 10 or as the case may be 11 are drawn together and thereby the clamp jaws 13 and 16 are caused to be pressed against the fork 1. Since the clamp jaw 16 is pivotable, an adaptation to various frame shapes is made possible. The stroke of the tightening screw 19 is so designed, that the mounting assembly 5 is particularly suited for frames of diameters of from 6 to 40 mm.

After the securing of the mounting assembly 5 on the frame, the dial gauge 52 is so positioned that the teflon sensor probe 53 is oriented parallel to the axis of the wheel to be adjusted. This is easily accomplished due to the movability of the pivot arm 33. The two clamp screws 35 and 51 are only so tightened to the point, that the make it easy to move the dial gauge 52 and the swing arm 33 and so that a further tightening of the two clamp screws is normally not necessary. The dial gauge 52 is so positioned, that it is easily read and so that the teflon sensor probe 53 just makes contact with the rim 2.

By turning of the wheel the amplitude of the urging against the gauge is indicated. If the sideways deviation is so great that the tip of the teflon sensor probe 53 lifts off of the surface of the rim, then the dial gauge 52 is slid towards the rim to the point that the tip of the teflon sensor probe 53 during one entire rotation continuously contacts the rim. The dial gauge 52 is slidably displaceable approximately 8 mm in the dial gauge holder 50. By means of a turnable ring 55 the dial of the dial gauge 52 can be rotated. The dial is turned so that upon a full rotation of the wheel the indicated values fluctuate symmetrically about the value of 0. Hereafter the spokes 3 are so tightened, that the dial gauge indication is progressively reduced, until it completely disappears.

An important advantage of the bicycle centering device is seen therein, that the correct direction of correction for tightening of the spokes can be read off of the dial gauge 52. If an incorrect direction of rotation for the tightening of the spokes is selected, this is immediately indicated on the dial gauge 52, since the needle would not move in the direction towards 0, but rather would move away therefrom. The measurement accuracy of the discussed device is 0.02 mm. With the help of the bicycle centering device it is easily possible, to provide an out of trueness of under 0.2.

Figure 2:
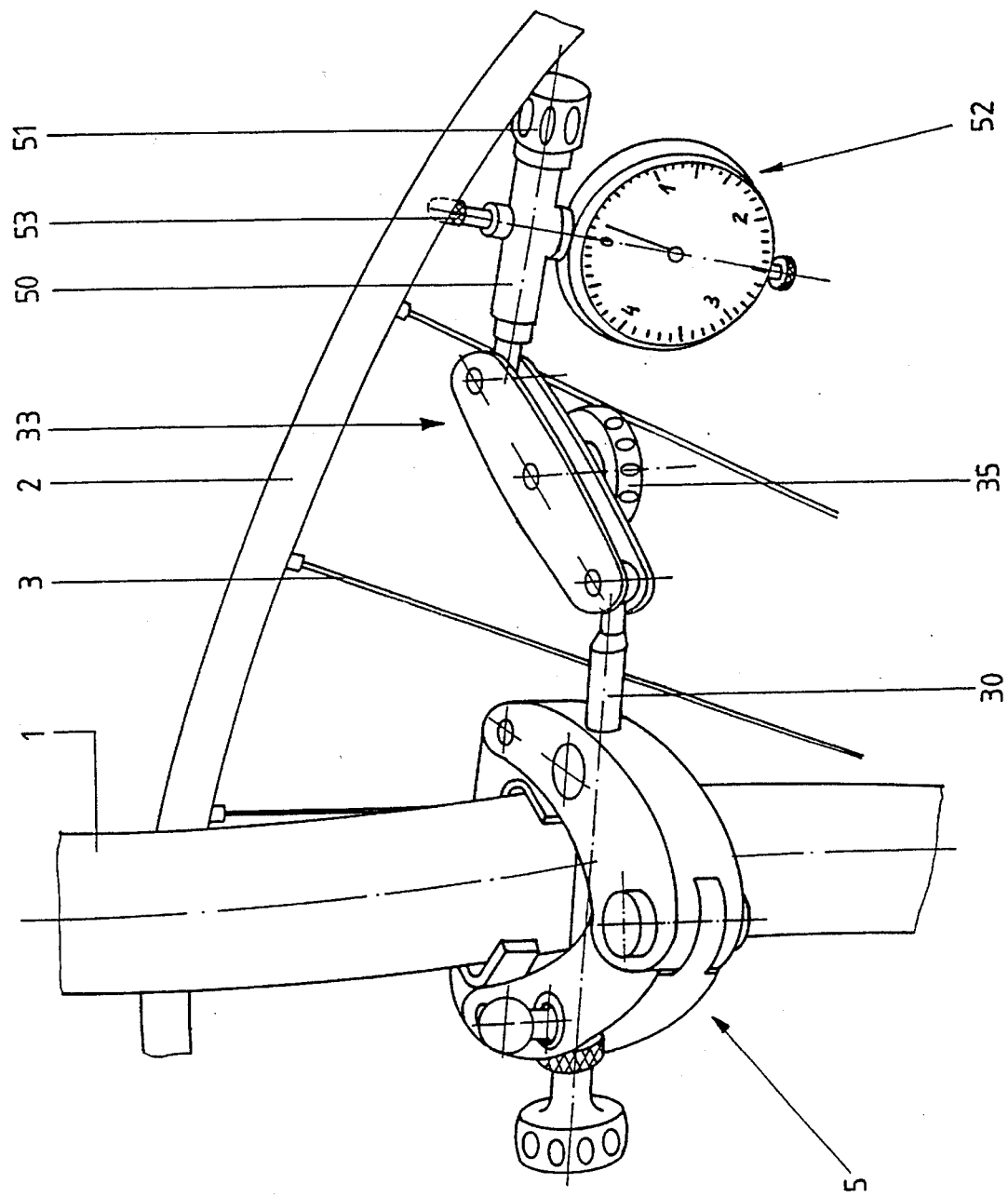
FIG. 2: view of one of the rim alignment devices secured to the forks of a bicycle for the correction of the rim diameter (out-of-round correction).
Figure 3:
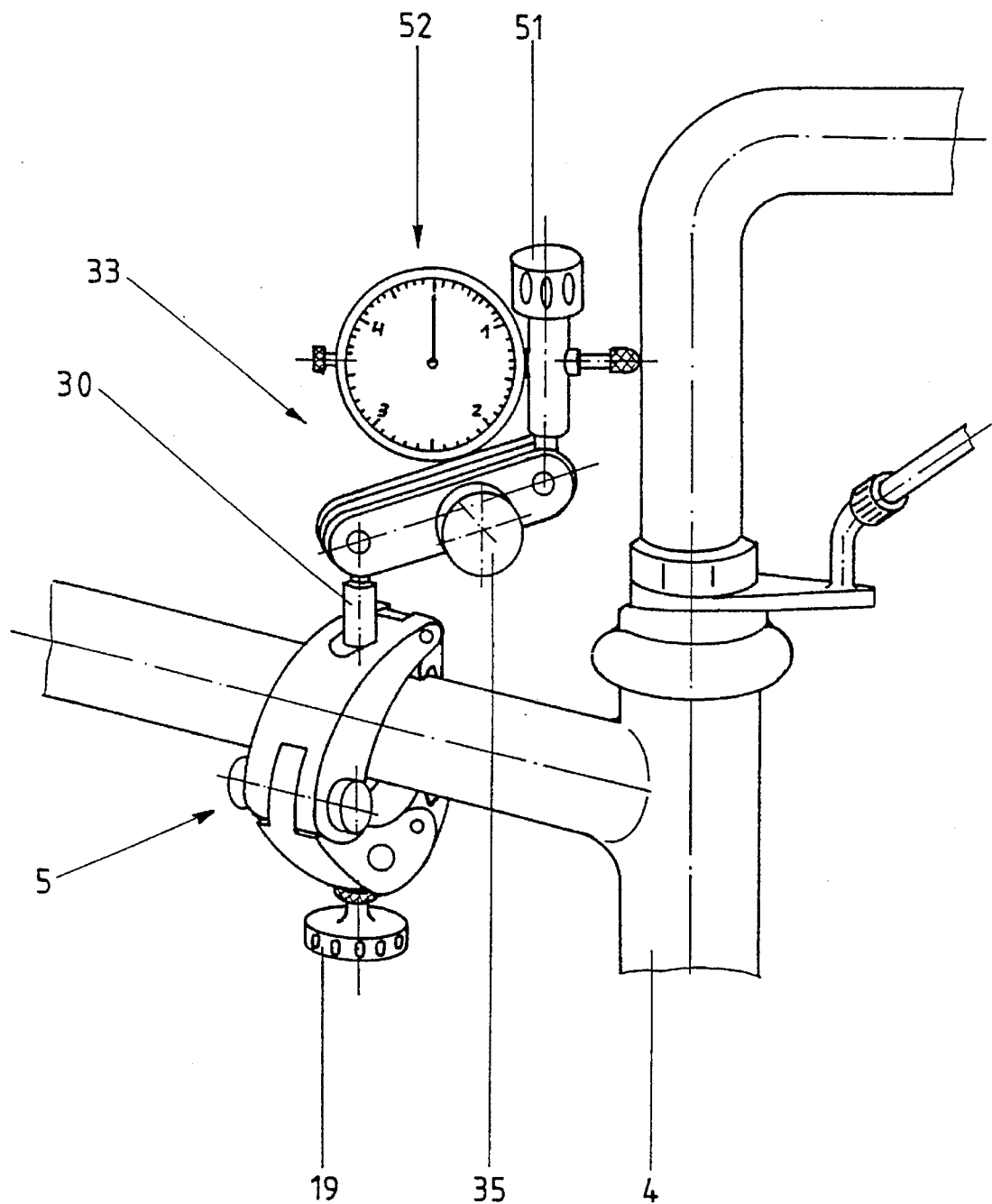
FIG. 3: view of one of the rim alignment devices secured to the frame of a bicycle for measurement of the handlebar stem clearance.

As a further possibility of utilization the bicycle centering device can naturally also be used for the measuring and correcting of the out-of-round of a tire rim (FIG. 2). For this the mounting assembly 5 is so positioned, that the teflon sensor probe 53 is positioned approximately radially on the inner side of the bicycle wheel rim 2. The correction of the out-of-round is accomplished in the same manner as the out of true.

Now that the invention has been explained, what is claimed is

1. A bicycle centering device, said device comprising:
    a mounting assembly (5) adapted to be mounted on the frame or fork of a bicycle, and including a ball pin (30) having a ball-shaped end;
    a dial gauge (52) comprising a dial, a dial gauge holder (50), and a sensor probe, said dial gauge holder including a ball pin (60) having a ball-shaped end; and
    a pivot arm (33), said pivot arm being rotatably and pivotably connected on one end to said ball pin (30) of said mounting assembly (5) and being rotatably and pivotably connected on the other end with said ball pin (60) of said dial gauge holder (52),
    wherein the pivot arm (33) is connected on one end to said ball-shaped end of said ball pin (30) of said mounting assembly (5) and on the other end to said ball-shaped end of said ball pin (60) of said dial gauge holder (50) of the dial gauge (52) to form ball joints (30, 60, 80), and
    wherein the pivot arm (33) is comprised of two parts (33a, b), said two parts being urged together by means of a clamp screw (35), said parts (33a, b) being provided with bore holes for receiving said ball-shaped end of said ball pin (30) of the mounting assembly (5) and said ball-shaped end of said ball pin (60) of said dial gauge holder (50).

2. A bicycle centering device according to claim 1, wherein said dial gauge (52) includes an analog indicator.

3. A bicycle centering device, said device comprising:
    a mounting assembly (5) adapted to be mounted on the frame or fork of a bicycle bicycle, and including a ball pin (30) having a ball-shaped end;
    a dial gauge (52) comprising a dial, a dial gauge holder (50), and a sensor probe, said dial gauge holder including a ball pin (60) having a ball-shaped end; and
    a pivot arm (33), said pivot arm being rotatably and pivotably connected on one end to said ball pin (30) of said mounting assembly (5) and being rotatably and pivotably connected on the other end with said ball pin (60) of said dial gauge holder (52),
    wherein the pivot arm (33) is connected on one end to said ball-shaped end of said ball pin (30) of said mounting assembly (5) and on the other end to said ball-shaped end of said ball pin (60) of said dial gauge holder (50) of the dial gauge (52) to form ball joints (30, 60, 80),
    wherein the pivot arm (33) is comprised of two parts (33a, b), said two parts being urged together by means of a clamp screw (35), said parts (33a, b) being provided with bore holes for receiving said ball-shaped end of said ball pin (30) of the mounting assembly (5) and said ball-shaped end of said ball pin (60) of said dial gauge holder (50), and
    wherein said mounting assembly is comprised of two clamp arms (10, 11), which are pivotably connected on one end and free on the other end, and which on their free end are provided respectively with "V" shaped mounting jaws (13 and 16), and a tightening means comprising a draw rod (20) and associated tightening screw (19), said draw rod being pivotally connected with one clamp arm, said draw rod being provided with threading, and said threading being received in a threaded bore hole in the other of said clamp arms, such that by turning of the tightening screw the clamp arms can be caused to be drawn towards each other.

* * * * *